July 24, 1934.  W. B. DREVITSON  1,967,228
FISH POSITIONING MACHINE
Filed Dec. 1, 1931
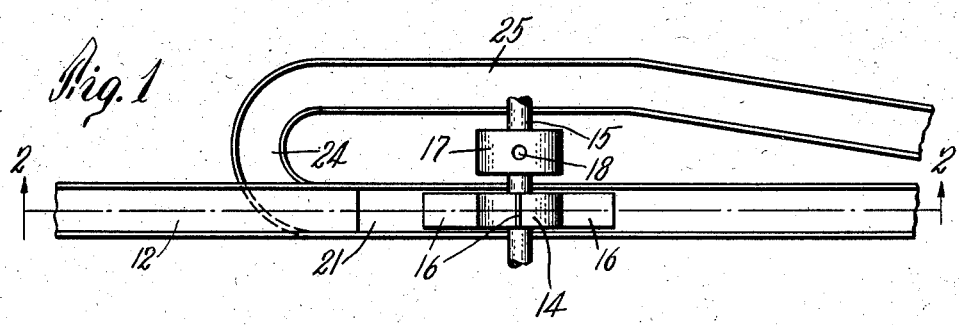
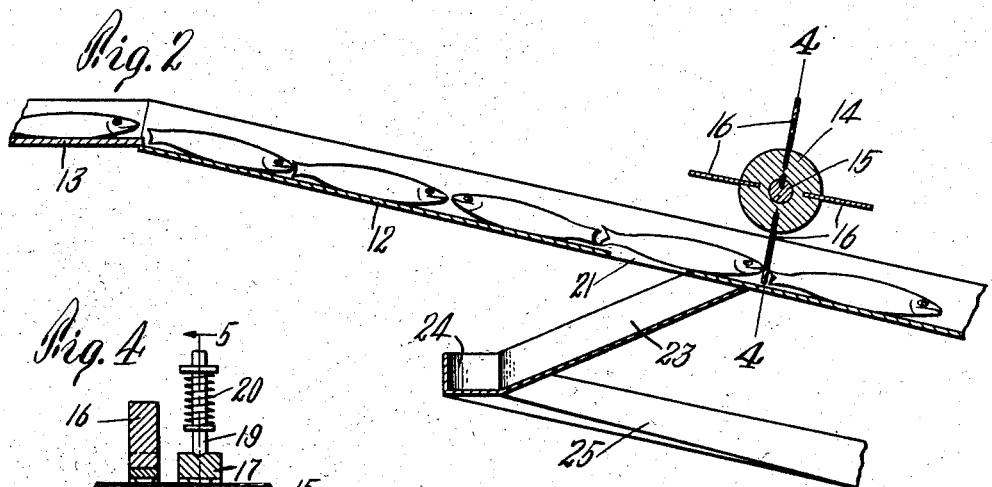
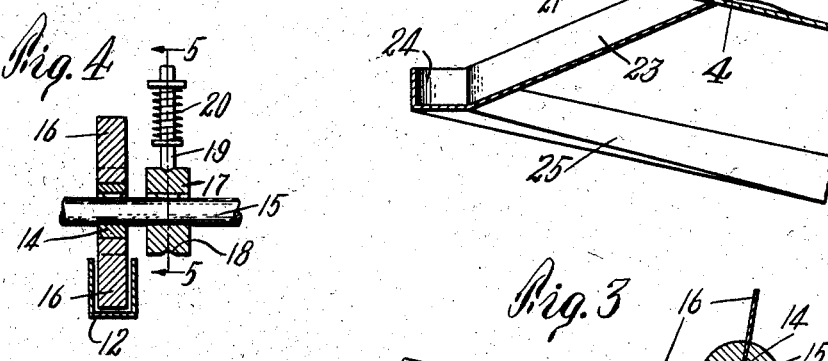
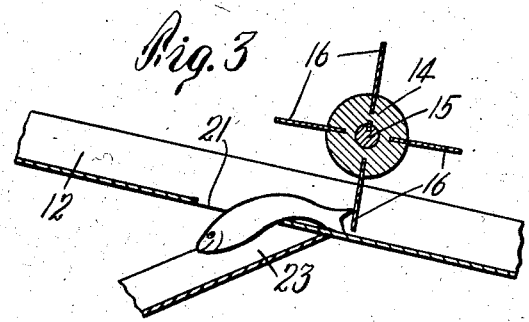
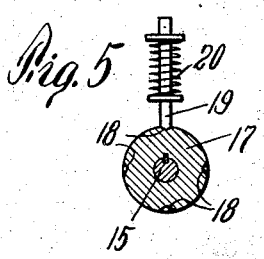
Inventor
Wesley B. Drevitson Patented July 24, 1934

1,967,228

UNITED STATES PATENT OFFICE 1,967,228

FISH-POSITIONING MACHINE

Wesley B. Drevitson, Millbrae, Calif., assignor to Food Machinery Corporation, San Jose, Calif., a corporation of Delaware Application December 1, 1931, Serial No. 578,320

4 Claims. (Cl. 17—2)

This invention relates to an improved method of and improved means for so positioning fish while they are moving to a delivering point at which they are to be treated to prepare them for market, that all the delivered fish will lie with their heads in the same direction, this being a desideratum in the preparation of fish for the market.

The invention is based upon the fact that fish heads are relatively rigid and non-yielding while, as compared with the heads, the tails are relatively limp and yielding, so that when the fish are caused to move by gravity in a procession composed of a single file of fish, longitudinally aligned so that each fish extends lengthwise of the procession, it is possible to obstruct the passage of those fish moving tail foremost by means of a suitable obstruction which may, at the same time, be sufficiently unstable or yieldable to be displaced by and permit the passage therepast of those fish moving head foremost. This principle is employed in the present invention to separate from the procession those fish moving tail foremost which, by the provision of suitable means for the purpose, are then turned about so as to continue their advance in head foremost position.

In the accompanying drawing forming a part of this specification,—

Figure 1 is a fragmentary top plan view, showing the essential parts of a fish sorting machine embodying the invention.

Figure 2 is a longitudinal section on the plane of line 2—2 of Figure 1.

Figure 3 is a fragmentary view similar to a portion of Figure 2, and illustrating the operation of dropping a fish moving tail foremost.

Figure 4 is a section on line 4—4 of Figure 2.

Figure 5 is a section on line 5—5 of Figure 4.

The same reference characters indicate the same parts in all of the figures.

In the drawing, 12 designates an inclined chute adapted to conduct a procession of longitudinally alined fish in single file, the procession being movable by gravity in the chute which may be lubricated by water or brine. At the head of the chute is a table 13 adapted to receive a mass of fish and permit their movement into the chute.

I locate detent means between the ends of the chute, said means including a member normally projecting into the path of the procession, and displaceable from said path by the impact of the head of a fish, so that continuous movement through the chute to a point of delivery at the lower end thereof, of a fish moving head foremost, is permitted. Said member is however non-displaceable by impact of the tail of the fish. I provide means cooperating with said detent means in permitting the dropping from the procession of a fish moving tail foremost.

In the embodiment of the invention here shown, the detent means includes a wheel composed of a hub 14, having an axis 15 transverse to the chute, and a plurality of spaced apart detent members 16, radiating from the hub, and adapted to project successively into the chute, and means normally opposing rotation of said wheel and caused by the impact of a fish head against a member 16 to permit such rotation. Said opposing means may comprise a disk 17 fixed to the axis 15, and provided with depressions 18 in its periphery, and a pin 19 movable in fixed guides and pressed by a spring 20 successively into the depressions 18. The means cooperating with the detent means in permitting the dropping of a fish from the procession is organized to cause the presentation of the dropped fish head foremost at the point of delivery. Said means as here shown, includes first an outlet 21 in the bottom of the chute 12, arranged as best shown by Figure 3, so that when the tail of a fish moving tail end foremost, encounters a detent member 16, the fish is arrested while in position to drop head first through the opening 21, and secondly, an inclined bypass chute having a receiving end located under the opening 21. Said bypass chute in this instance, includes a rearwardly extending portion 23, arranged to receive a fish dropping through the opening 21, and conducted rearwardly head foremost, a looped portion 24, and a forwardly extending portion 25 connected by the looped portion with the rearwardly extending portion 23.

The arrangement is such that an arrested and dropped fish is presented head foremost at a point of delivery. The main chute 12 and the portion 25 of the bypass chute may converge to a common point of delivery at which all of the fish fed into the chute 12 eventually arrive head foremost.

The detent members 16 collectively constitute the equivalent of a swingable gate extending into the chute, the hub 14 having an axis transverse to the chute. The described means normally opposing the rotation of the hub constitute a suitable embodiment of means for yieldingly arresting the gate in position to encounter a fish end, permitting the displacement of the gate from said position when it is encountered by a head end, and locating the gate in its encountering position after each displacement.

It will be seen that the gate, when in its encountering position, is spaced from the lower end of the drop out opening 21, and that said opening is shorter than a fish of the size being sorted, the arrangement being such that a fish moving head foremost slides over the opening, and displaces the gate, and a fish moving tail foremost is first arrested by the gate and then drops, head downward, through the opening as shown by Figure 3.

As implied by the foregoing description and the following claims, I am not limited to the specific embodiment of the invention shown by the drawing, except as otherwise required by certain of the more limited claims.

I claim:

1. A fish-positioning machine comprising an inclined chute adapted to conduct a procession of longitudinally aligned fish in a single file, detent means normally projecting into the path of said procession and displaceable from said path by the impact of the head of a fish, so that continuous movement through the chute, to a point of delivery, of a fish moving head foremost is permitted, said detent means being non-displaceable by impact of the tail of a fish, and means cooperating with said detent means in permitting the dropping from the procession of a fish moving tail foremost, said detent means including a wheel having an axis transverse to the chute, spaced apart detent members adapted to project successively into the chute, and means normally opposing the rotation of said wheel, and caused by the impact of a fish head against the member to permit such rotation.

2. A fish-positioning machine comprising an inclined chute for conducting a procession of longitudinally aligned fish in single file, and having in its inclined bottom a drop out opening shorter than a fish, a swingable gate extending into the chute, and means for yieldingly arresting said gate in position to encounter a fish end, said means having provision for maintaining the gate in its encountering position when it is encountered by a tail end, permitting the displacement of the gate from said position when it is encountered by a head end, and locating the gate in its encountering position after each displacement, the gate, when in its encountering position, being spaced from the lower end of said opening, the arrangement being such that a fish moving head foremost slides over the opening and displaces the gate, and a fish moving tail foremost is first arrested by the gate and then drops head downward through the opening.

3. A fish-positioning machine comprising an inclined chute for conducting a procession of longitudinally aligned fish in single file, said chute having a drop out opening in its inclined bottom intermediate its length, and means for diverting those fish passing down the chute tail foremost, head downward through said opening, comprising a swingable gate extending into the chute adjacent the lower end of the opening, said gate being displaceable by impact of fish striking the same head foremost, and non-displaceable by impact of fish striking the same tail foremost.

4. A fish-positioning machine comprising an inclined chute for conducting a procession of longitudinally aligned fish in single file, said chute having a drop out opening in its inclined bottom intermediate its length, and means for diverting those fish passing down the chute tail foremost, head downward through said opening, comprising a swingable gate extending into the chute adjacent the lower end of the opening, and yieldable means for holding said gate in obstructing position with sufficient rigidity to prevent its displacement by the impact of fish striking the gate tail foremost, but with insufficient rigidity to prevent displacement by impact of fish striking the gate head foremost.

WESLEY B. DREVITSON.